(12) United States Patent
Van Wyk

(10) Patent No.: US 10,327,048 B2
(45) Date of Patent: *Jun. 18, 2019

(54) AUTOMATIC NETWORK TOPOLOGY DETECTION AND FRAUD DETECTION

(71) Applicant: Itron Global SARL, Liberty Lake, WA (US)

(72) Inventor: Hartman Van Wyk, Montloius sur Loire (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,651

(22) Filed: Mar. 19, 2018

(65) Prior Publication Data

US 2018/0213304 A1  Jul. 26, 2018

Related U.S. Application Data

(63) Continuation of application No. 13/560,078, filed on Jul. 27, 2012, now Pat. No. 9,924,242, which is a (Continued)

(30) Foreign Application Priority Data

Apr. 20, 2012 (EP) .................................. 12165026

(51) Int. Cl.
  *H04Q 9/00* (2006.01)
  *H02J 13/00* (2006.01)
(52) U.S. Cl.
  CPC ........... *H04Q 9/00* (2013.01); *H04Q 2209/60* (2013.01)
(58) Field of Classification Search
  None
  See application file for complete search history.

(56) References Cited

U.S. PATENT DOCUMENTS

| 4,146,841 A | 3/1979 | McRae |
| 4,532,471 A | 7/1985 | Hurley |

(Continued)

FOREIGN PATENT DOCUMENTS

| DE | 102008044915 A1 | 3/2010 |
| DE | 102013106393 A1 | 12/2013 |

(Continued)

OTHER PUBLICATIONS

The Australian Office Action dated May 17, 2018 for Australian Patent Application No. 2017202822, a counterpart foreign application of U.S. Appl. No. 13/560,078, 2 pages.

(Continued)

*Primary Examiner* — Muhammad N Edun
*Assistant Examiner* — Jerold B Murphy
(74) *Attorney, Agent, or Firm* — Lee & Hayes, P.C.

(57) ABSTRACT

Given a node of a utility service distribution network, a topology of a subset of the distribution network having the given node as a root node and one or more child nodes branching from the given node is determined. The topology may be determined based on relationships or correlations of utility usage information between the given node and a plurality of potential nodes that are considered in the topology determination. Upon determining the topology associated with the given node, the determined topology may be used to detect fraud and leakage that may occur in the distribution network on a regular basis or upon request. If fraud or leakage is detected in the distribution network, the system may schedule a follow-up and/or field investigation to investigate and fix the fraud or the leakage in the distribution network.

20 Claims, 4 Drawing Sheets

Related U.S. Application Data continuation of application No. PCT/US2012/034697, filed on Apr. 23, 2012.

(56) References Cited

U.S. PATENT DOCUMENTS

| | | | |
|---|---|---|---|
| 4,930,064 A | 5/1990 | Tanaka et al. | |
| 5,184,119 A | 2/1993 | Stanbury et al. | |
| 5,617,329 A | 4/1997 | Allison et al. | |
| 5,673,196 A | 9/1997 | Hoffman et al. | |
| 5,831,423 A | 11/1998 | Mancini | |
| 5,920,720 A | 7/1999 | Toutonghi et al. | |
| 6,334,050 B1 | 12/2001 | Skarby | |
| 6,456,097 B1 | 9/2002 | Sutherland | |
| 7,272,518 B2 | 9/2007 | Bickel et al. | |
| 7,523,185 B1 | 4/2009 | Ng et al. | |
| 7,583,197 B2 | 9/2009 | Wesby Van Swaay | |
| 7,936,163 B2 | 5/2011 | Lee, Jr. | |
| 8,094,010 B2 | 1/2012 | Wesby-van Swaay | |
| 8,283,911 B1 | 10/2012 | Bierer | |
| 8,301,386 B1 | 10/2012 | Redmond et al. | |
| 8,639,391 B1 | 1/2014 | Alberth, Jr. et al. | |
| 8,797,018 B2 | 8/2014 | Watkins et al. | |
| 9,031,800 B2 | 5/2015 | Filippenko et al. | |
| 9,230,429 B2 | 1/2016 | McKinley et al. | |
| 9,924,242 B2* | 3/2018 | Van Wyk | H04Q 9/00 |
| 2005/0063317 A1 | 3/2005 | Risberg et al. | |
| 2005/0177646 A1 | 8/2005 | Kawano et al. | |
| 2006/0071776 A1 | 4/2006 | White, II et al. | |
| 2006/0167981 A1 | 7/2006 | Bansod et al. | |
| 2007/0247331 A1 | 10/2007 | Angelis | |
| 2008/0089390 A1 | 4/2008 | Picard | |
| 2009/0045976 A1 | 2/2009 | Zoldi et al. | |
| 2009/0058088 A1 | 3/2009 | Pitchford et al. | |
| 2009/0276170 A1 | 11/2009 | Bickel | |
| 2009/0299660 A1 | 12/2009 | Winter | |
| 2010/0002348 A1 | 1/2010 | Donolo et al. | |
| 2010/0007336 A1 | 1/2010 | de Buda | |
| 2010/0060259 A1 | 3/2010 | Vaswani et al. | |
| 2010/0088431 A1 | 4/2010 | Oshins et al. | |
| 2010/0134089 A1 | 6/2010 | Uram et al. | |
| 2010/0142447 A1 | 6/2010 | Schlicht et al. | |
| 2010/0179704 A1 | 7/2010 | Ozog | |
| 2011/0116387 A1 | 5/2011 | Beeco et al. | |
| 2011/0122798 A1 | 5/2011 | Hughes et al. | |
| 2011/0126176 A1 | 5/2011 | Kandasamy et al. | |
| 2011/0215945 A1 | 9/2011 | Peleg et al. | |
| 2011/0254525 A1 | 10/2011 | Gaknoki et al. | |
| 2012/0041696 A1 | 2/2012 | Sanderford, Jr. et al. | |
| 2012/0062210 A1 | 3/2012 | Veillette | |
| 2012/0117392 A1 | 5/2012 | Turicchi, Jr. et al. | |
| 2012/0126636 A1 | 5/2012 | Atsumi | |
| 2012/0169300 A1 | 7/2012 | Rouaud et al. | |
| 2012/0181974 A1 | 7/2012 | Kuniyosi et al. | |
| 2012/0198037 A1 | 8/2012 | Shelby et al. | |
| 2012/0201195 A1 | 8/2012 | Rausch et al. | |
| 2012/0229089 A1 | 9/2012 | Bemmel et al. | |
| 2013/0024149 A1 | 1/2013 | Nayar et al. | |
| 2013/0035885 A1 | 2/2013 | Sharon et al. | |
| 2013/0076534 A1 | 3/2013 | Conant et al. | |
| 2013/0101003 A1 | 4/2013 | Vedantham et al. | |
| 2013/0110425 A1 | 5/2013 | Sharma et al. | |
| 2013/0241746 A1 | 9/2013 | McKinley et al. | |
| 2013/0242867 A1 | 9/2013 | Bell | |
| 2013/0275736 A1 | 10/2013 | Kelley et al. | |
| 2013/0278437 A1 | 10/2013 | Wyk | |
| 2013/0335062 A1 | 12/2013 | de Buda et al. | |
| 2014/0005964 A1 | 1/2014 | Rouaud et al. | |
| 2014/0012524 A1 | 1/2014 | Flammer, III | |
| 2014/0032506 A1 | 1/2014 | Hoey et al. | |
| 2014/0039818 A1 | 2/2014 | Arya et al. | |
| 2014/0049109 A1 | 2/2014 | Kearns et al. | |
| 2014/0074670 A1 | 3/2014 | Garrity et al. | |
| 2014/0161114 A1 | 6/2014 | Shuey | |
| 2014/0173600 A1 | 6/2014 | Ramakrishnan Nair | |
| 2014/0214218 A1 | 7/2014 | Eldridge et al. | |
| 2014/0236506 A1 | 8/2014 | Nikovski et al. | |
| 2014/0330955 A1 | 11/2014 | Bishop et al. | |
| 2014/0337429 A1 | 11/2014 | Asenjo et al. | |
| 2014/0358839 A1 | 12/2014 | Dhurandhar et al. | |
| 2014/0368189 A1 | 12/2014 | Bernheim et al. | |
| 2014/0379303 A1 | 12/2014 | Chandrashekaraiah et al. | |
| 2015/0052088 A1 | 2/2015 | Arya et al. | |
| 2015/0103672 A1 | 4/2015 | Stuart | |
| 2015/0241482 A1 | 8/2015 | Sonderegger | |
| 2015/0241488 A1 | 8/2015 | Sonderegger | |
| 2015/0280782 A1 | 10/2015 | Airbinger et al. | |
| 2015/0377949 A1 | 12/2015 | Ramirez | |
| 2016/0109491 A1 | 4/2016 | Kann | |
| 2016/0109497 A1 | 4/2016 | Aiello et al. | |
| 2016/0142514 A1 | 5/2016 | Stuber et al. | |
| 2016/0154040 A1 | 6/2016 | Driscoll et al. | |
| 2016/0173237 A1 | 6/2016 | Braun et al. | |
| 2016/0352103 A1 | 12/2016 | Aiello et al. | |
| 2017/0168098 A1 | 6/2017 | Aiello et al. | |
| 2018/0156851 A1 | 6/2018 | Driscoll et al. | |

FOREIGN PATENT DOCUMENTS

| | | |
|---|---|---|
| EP | 1460801 A1 | 9/2004 |
| GB | 2426596 A | 11/2006 |
| JP | 06273200 A1 | 9/1994 |
| JP | 2000175358 A1 | 6/2000 |
| JP | 2000249730 A1 | 9/2000 |
| JP | 2004340767 A1 | 12/2004 |
| JP | WO2007063180 A1 | 6/2007 |
| JP | 2012016270 A1 | 1/2012 |
| JP | 2012058233 A1 | 3/2012 |
| JP | 2012521596 A1 | 9/2012 |
| JP | 2014079138 A1 | 5/2014 |
| JP | 2015076994 A1 | 4/2015 |
| JP | 2015107012 A1 | 6/2015 |
| WO | WO2009061291 A1 | 5/2009 |
| WO | WO2010105038 A1 | 9/2010 |
| WO | WO2010110787 A1 | 9/2010 |
| WO | WO2014124318 A1 | 8/2014 |

OTHER PUBLICATIONS

The Australian Office Action dated Jun. 15, 2018 for Australian Patent Application No. 2016266732, a counterpart foreign application of U.S. Appl. No. 15/058,112, 3 pages.

Office action for U.S. Appl. No. 14/280,286, dated Sep. 11, 2018, Sonderegger, "Smart Grid Topology Estimator," 21 pages.

The Canadian Office Action dated Apr. 9, 2018 for Canadian patent application No. 2969685, a counterpart foreign application of U.S. Pat. No. 9,835,662, 4 pages.

The Japanese Office Action dated Apr. 24, 2018 for Japanese Patent Application No. 2016-553860, a counterpart foreign application of U.S. Appl. No. 14/280,286, 4 pages.

The Japanese Office Action dated Apr. 3, 2018 for Japanese Patent Application No. 2016-553886, a counterpart foreign application of U.S. Appl. No. 14/302,617, 11 pages.

Office Action for U.S. Appl. No. 15/431,473, dated May 14, 2018, Aiello, "Electrical Phase Identification," 7 pages.

Office Action for U.S. Appl. No. 15/058,112, dated Mar. 29, 2018, Aiello, "Automatic Network Device Electrical Phase Identification," 14 pages.

Australian Examination Report dated Apr. 28, 2016, for Australian Patent Application No. 212377368, a counterpart application of U.S. Appl. No. 13/560,078, 3 pages.

The Australian Office Action dated Jan. 5, 2018 for Australian Patent Application No. 2017202822, a counterpart foreign application of U.S. Appl. No. 13/560,078, 3 pages.

The Australian Office Action dated Mar. 17, 2017 for Australian Patent Application No. 2015223145, a counterpart foreign application of U.S. Appl. No. 14/280,286, 4 pages.

The Australian Office Action dated Aug. 23, 2017 for Australian Patent Application No. 2015223053, a counterpart foreign application of U.S. Appl. No. 14/302,617, 10 pages.

(56) References Cited

OTHER PUBLICATIONS

Berthier et al., "Intrusion detection for advanced metering infrastructures: Requirements and architectural directions," In Smart Grid Communications (SmartGridComm), 2010 First IEEE International Conference on Oct. 4, 2010, pp. 350-355.
The Canadian Office Action dated Oct. 26, 2016 for Canadian patent applicatoin No. 2863596, a counterpart foreign application of U.S. Appl. No. 13/560,078, 3 pages.
Do et al., "Open-Source Testing Tools for Smart Grid Communication Network," 2013 IEEE Conference on Open Systems (ICOS), Dec. 2, 2013, pp. 156-161, retrieved on Feb. 7, 2014
Communication pursuant to Article 94(3) EPC dated Jul. 29, 2016, for EP Application No. 12165026.1, a counterpart application of U.S. Appl. No. 13/560,078, 6 pages.
The Extended European Search Report dated Sep. 6, 2012 for European patent application No. 12165026.1, 6 pages.
Handley et al., "ComEd Corrects Meter-Transformer Mismatches," ComEd Paper, Sep. 7, 2016, 8 pages.
"Health Device Profile," Medical Devices WG, Internet citation, Jun. 26, 2008, pp. 1-44, retrieved from the internet on Nov. 9, 2015 at <<https://www.bluetooth.org/docman/handlers/DownloadDoc.ashx?doc_id=260864&vId=290095&_ga=1.128761092.961309788.1447059724>>.
Translated Japanese Office Action dated Oct. 28, 2014 for Japanese patent application No. 2014-511377, a counterpart foreign application of U.S. Appl. No. 13/560,078, 5 pages.
Translated Japanese Office Action dated Apr. 22, 2014 for Japanese patent application No. 2014-511377, a counterpart foreign application of U.S. Appl. No. 13/560,078, 6 pages.
The Japanese Office Action dated Aug. 29, 2017 for Japanese Patent Application No. 2016-553886, a foreign counterpart application of U.S. Appl. No. 14/302,617, 17 pages.
The Japanese Office Action dated Sep. 12, 2017 for Japanese patent application No. 2016-553860, a counterpart foreign application of U.S. Appl. No. 14/280,286, 9 pages.
Madden et al., "TinyDB: An Acquisitional Query Processing System for Sensor Networks," ACM Transactions on Database Systems, vol. 30, No. 1, Mar. 1, 2005, pp. 122-173.
Maqousi et al., "Towards an Open Architecture for Smart Grid Communications: Possible Pointers from Multiservice Network Research," 2013 1st International Conference & Exhibition on the Applications of Information Technology to Renewable Energy Processes and Systems, IEEE, May 29, 2013, pp. 114-118, retrieved on Aug. 29, 2013.
Moritz et al., "A CoAP based SOAP Transport Binding," IEEE Conference on Emerging Technologies and Factory Automation (ETFA'2011), Sep. 2011, 4 pages.
Notice of Allowance dated Oct. 4, 2016, for U.S. Appl. No. 14/531,845, 9 pages.
Notice of Allowance dated Feb. 6, 2017, for U.S. Appl. No. 14/547,561, 22 pages.
Office action for U.S. Appl. No. 14/280,286, dated Feb. 16, 2016, Sonderegger, "Smart Grid Topology Estimator," 19 pages.
Office Action for U.S. Appl. No. 14/280,286, dated Mar. 17, 2017, Sonderegger, "Smart Grid Topology Estimator," 13 pages.
Final Office Action for U.S. Appl. No. 13/560,078, dated Jul. 1, 2015, Hartman Van Wyk, "Automatic Network Topology Detection and Fraud Detection," 23 pages.
Office Action for U.S. Appl. No. 14/518,564, dated Jul. 20, 2017, Kann, "Grid Topology Mapping With Voltage Data," 18 pages.
Office action for U.S. Appl. No. 14/547,561, dated Jul. 29, 2016, Stuber, "Application Platform Operable on Network Node," 33 pages.
Office action for U.S. Appl. No. 14/280,286, dated Aug. 11, 2017, Sonderegger, "Smart Grid Topology Estimator," 15 pages.
Final Office Action for U.S. Appl. No. 14/280,286, dated Aug. 4, 2016, Robert Sonderegger, "Smart Grid Topology Estimator," 20 pages.

"Open Smart Grid Protocol (OSGP); draft ETSI GS OSG 001," European Telecommunications Standards Institute (ETSI), France, vol. zArchive—ISG, No. VO.1.2, Sep. 2011, pp. 1-250, retrieved on Nov. 15, 2011 (ETSI).
Regehr et al.,"TinyOS 2.1 Adding Threads and Memory Protection to TinyOS," proceedings of the 6th ACM conference on Embedding Network Sensor Systems (SenSys'08), Apr. 2008, 2 pages.
Sharon et al., "Topology Identification in Distribution Network with Limited Measurements," Innovative Smart Grid Technology Conference, Jan. 16-20, 2012, IEEE, pp. 1-6.
Short, "Advanced Metering for Phase Identification, Transformer Identification, and Secondary Modeling," IEEE Transactions on Smart Grid, IEEE, USA, vol. 4, No. 2, Jun. 1, 2013, pp. 651-658.
Snell, "Call SOAP Web services with Ajax Part 1: Build the Web services client," IBM Corporation developerWorks, Oct. 2005, 13 pages.
The European Office Action dated Dec. 4, 2018 for European Patent Application No. 15710638.6, a counterpart of U.S. Appl. No. 14/280,286, 6 pages.
Office Action for U.S. Appl. No. 14/302,617, dated Jan. 11, 2019, Robert Sonderegger, "Detection of Electric Power Diversion," 35 pages.
The Australian Office Action dated Oct. 25, 2018 for Australian Patent Application No. 2017202822, a counterpart foreign application of U.S. Pat. No. 9,924,242, 5 pages.
The Canadian Office Action dated Oct. 2, 2018, for Canadian patent Application No. 2987580, a counterpart foreign patent application of the U.S. Appl. No. 15/058,112.
The European Office Action dated Sep. 17, 2018, for European Patent Application No. 15710639.4, a counterpart foreign application of U.S. Appl. No. 14/302,617, 10 pages.
Office Action for U.S. Appl. No. 14/302,617, dated Sep. 18, 2018, Robert Sonderegger, Detection of Electric Power Diversion,, 39 pages.
Office action for U.S. Appl. No. 13/560,078, dated Oct. 2, 2015, Van Wyk, "Automatic Network Topology Detection and Fraud Detection", 29 pages.
Final Office Action for U.S. Appl. No. 13/560,078, dated Oct. 6, 2014, Hartman Van Wyk, "Automatic Network Topology Detection and Fraud Detection," 34 pages.
Office action for U.S. Appl. No. 13/560,078, dated Dec. 16, 2013, Van Wyk, "Automatic Network Topology Detection and Fraud Detection," 23 pages.
Office Action for U.S. Appl. No. 13/560,078, dated Feb. 13, 2015, Hartman Van Wyk, "Automatic Network Topology Detection and Fraud Detection," 22 pages.
Office action for U.S. Appl. No. 13/560,078, dated Feb. 24, 2017, Van Wyk, "Automatic Network Topology Detection and Fraud Detection," 32 pages.
Office action for U.S. Appl. No. 13/560,078, dated Aug. 15, 2013, Van Wyk, "Automatic Network Topology Detection and Fraud Detection," 16 pages.
PCT Search Report and Written Opinion dated Jan. 28, 2016 for PCT application No. PCT/2015/056482, 10 pages.
PCT Search Report dated Jan. 31, 2013 for PCT application No. PCT/US12/34697, 9 pages.
PCT Search Report and Written Opinion dated Oct. 20, 2015 for PCT Application No. PCT/US15/44191, 11 pages.
PCT Search Report and Written Opinion dated Mar. 2, 2016 for PCT application No. PCT/US2015/061390, 15 pages.
PCT Search Report and Written Opinion dated May 22, 2015 for PCT application No. PCT/US2015/017571, 9 pages.
PCT Search Report and Written Opinion dated Jun. 1, 2015 for PCT Application No. PCT/US2015/017575.
PCT Search Report and Written Opinion dated Jul. 7, 2016 for PCT application No. PCT/US2016/030144, 12 pages.

\* cited by examiner

AUTOMATIC NETWORK TOPOLOGY DETECTION AND FRAUD DETECTION

RELATED APPLICATION

This application is a continuation of U.S. patent application Ser. No. 13/560,078, filed Jul. 27, 2012, which is a continuation of PCT International Application No. PCT/US12/34697, filed Apr. 23, 2012, which claims priority to European Application No. 12165026.1, filed on Apr. 20, 2012, and entitled "Automatic electric network topology detection and instantaneous fraud detection," all of which are incorporated herein by reference.

BACKGROUND

With the rapid expansion of metropolitan cities and the expansive growth of population, distribution networks for utilities such as electricity, gas and water, etc., have become unprecedentedly complicated. New metering devices, such as electricity meters, are added to the distribution networks to serve new areas and/or replace obsolete metering devices, while outdated metering devices are removed from the distribution networks. Given the tremendous number of metering devices in the distribution networks and the dynamics of the distribution networks, utility service providers find it impractical, if not impossible, to determine the topologies associated with the distribution networks, i.e., which metering device is connected to which junction node (e.g., a transformer in electricity service, etc.), for example.

Furthermore, without an accurate and up-to-date knowledge of the topologies of the distribution networks, the utility service providers may overlook fraud and/or leakage that occurs in the networks, thereby incurring losses to the utility service providers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
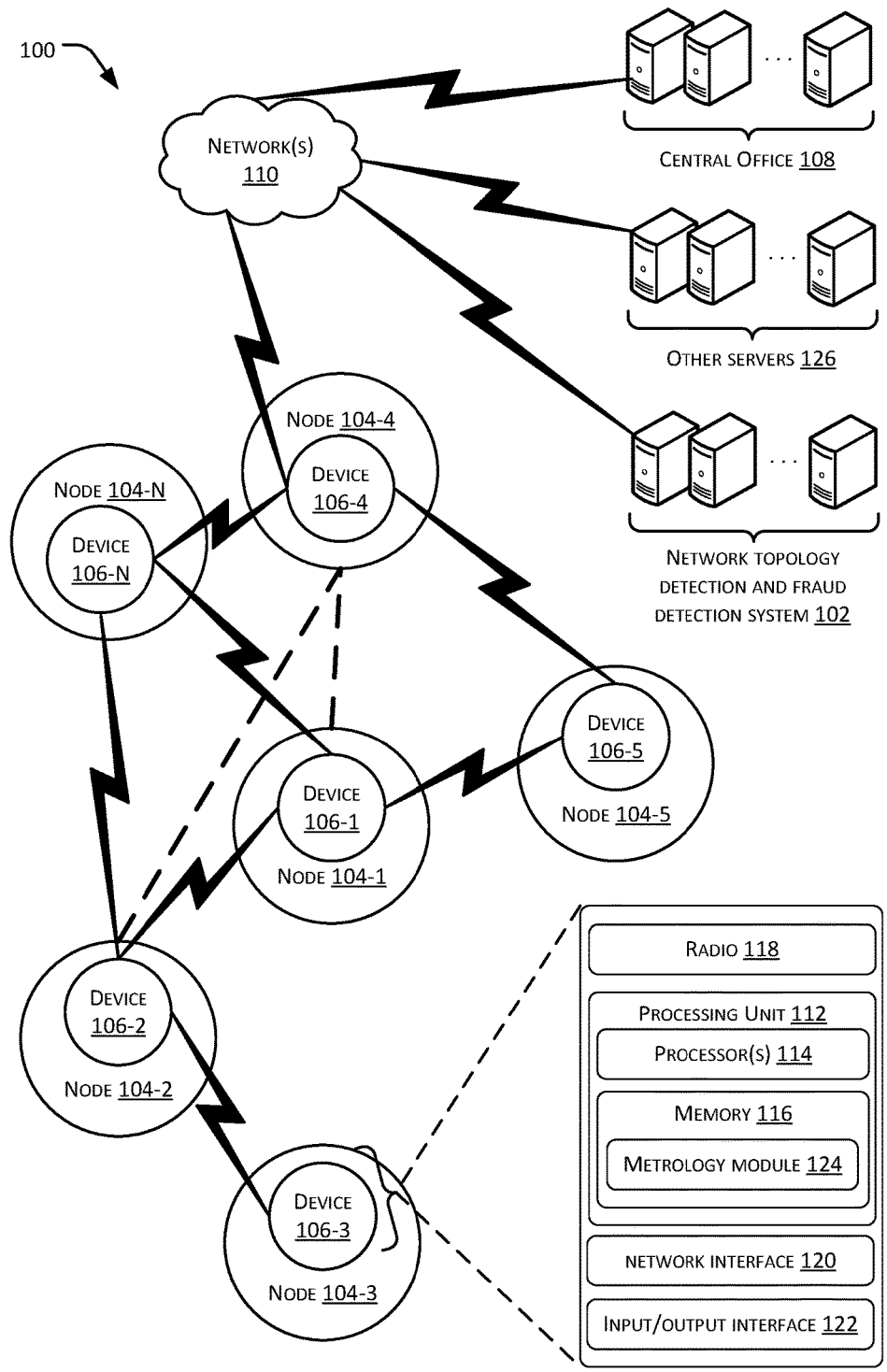
FIG. 1 illustrates an example environment usable to implement an example network topology detection and fraud detection system.

As noted above, existing utility service providers find it impractical, if not impossible, to determine topologies associated with distribution networks for providing utility services. Furthermore, without an accurate and up-to-date knowledge of the topologies of the distribution networks, determination of fraud and/or leakage in the networks is prone to errors and erroneously reports false positives and false negatives, thus causing a waste of resources to investigate these false positives and false negatives.

This disclosure describes a network topology detection and fraud detection system. The system enables automated detection of a topology of a network associated with a given node (i.e., detection of a topology of a network with the given node as a root node of the network). For example, given a node, the system allows determination of one or more child nodes that are immediately connected to the given node.

Generally, the system may be triggered to determine or select a node for which topology information is desired. The system may be triggered by occurrence of an event or condition (event-driven) or upon request of a user (user-driven). As an example of an event-driven trigger, the system may detect abnormal activities (such as significant changes in consumption of a utility service associated with the distribution network, etc.) in a node of the distribution network and may select that node for which topology information is to be determined. As an example of a user-driven trigger, the system may allow a user to select a node for which topology information is desired. Additionally or alternatively, the system may receive a request to determine a topology of a given node. Additionally or alternatively, the system may select a node for which topology information is to be determined on a regular basis, for example, every one week, every one month, etc. In one implementation, the selected node may be used as a root node for which the topology information is determined. In other implementations, the selected or given node may include an intermediate node of a distribution network through which a utility service (e.g., electricity, gas or water, etc.) is transmitted from a utility station of a service provider to a node where the utility service is consumed (e.g., a customer node). By way of example and not limitation, the selected node may include, a junction node, such as a transformer node or a substation node for electricity service, for example.

In response to receiving a selected or given node, the system may explore utility usage information received from metering devices associated with (or included in) a plurality of other nodes, and determine which one or more nodes are immediately connected to the selected node, or which one or more nodes to which the selected node delivers the utility service. In one implementation, the system may determine a topology associated with the selected node by comparing the utility usage information received from the plurality of nodes (or the metering devices associated therewith) with utility usage information recorded at the selected node.

In one implementation, the utility usage information of a node may include changes in usage values of the utility service recorded at a metering device associated with (or included in) the node at a regular time interval or at respective times of change in electricity usage, for example. Additionally or alternatively, the utility usage information of a node may include only, for example, changes in usage values (that are greater than or equal to a predetermined threshold or percentage) of the utility service recorded at a metering device associated with (or included in) the node at a regular time interval or at respective times of change of electricity usage, for example, etc. In one implementation, the utility usage information of a node may further include respective time stamps of the changes in usage values of the utility service recorded at a metering device associated with (or included in) the node.

In one implementation, the system may compare the utility usage information received from the plurality of nodes with the utility usage information recorded at the selected node by computing correlations between the utility usage information of the plurality of nodes and the utility usage information of the selected node. Additionally or alternatively, in one implementation, the system may determine whether a correlation between the utility usage information of a node of the plurality of nodes and the utility usage information of the selected node is greater than or equal to a predetermined correlation threshold. If the correlation between the utility usage information of the node and the utility usage information of the selected node is greater than or equal to the predetermined correlation threshold, the system may determine that the node is connected to the selected node, or in other words, the node is a component or part of the topology of a network associated with the selected node. By determining that a plurality of nodes are connected to the selected node, the system therefore successfully determines the topology of the network associated with the selected node, i.e., the topology of the network including the selected node and the plurality of determined nodes with the selected node being a root node of the network.

In some implementations, given a determined topology or a previously known topology of a network having a given node as a root node, the system may further monitor and determine whether a discrepancy exists in utility usage data among one or more nodes in the network including the given node and a plurality of child nodes. In one implementation, the discrepancy may include, but is not limited to, a discrepancy due to fraud (e.g., by tampering with or bypassing a metering device associated with a child node) and/or leakage associated with the utility service in the network. In one implementation, the system may determine whether a change in the utility usage recorded at the given node is unattributable by any combination of changes of one or more utility usages of the plurality of child nodes. Additionally or alternatively, the system may determine whether a value of utility usage recorded at the given node is different from a sum of values of the utility usages received from the plurality of child nodes at a particular time or over a particular period of time.

In one implementation, the system may detect that fraud and/or leakage exists in the network. By way of example and not limitation, the system may detect that a change in a utility usage of a child node is unattributable by (or unable to be correlated with) any change in the utility usage recorded at the given node. Additionally or alternatively, the system may detect that a change in the utility usage recorded at the given node is unattributable by (or unable to be correlated with) any combination of utility usages of one or more of the plurality of child nodes. Additionally or alternatively, the system may detect that a difference exists between a sum of the utility usages of the plurality of child nodes and the utility usage recorded at the given node, and each change in the utility usages of the plurality of child nodes are attributable by (or able to be correlated with) a change in the utility usage recorded at the given node over one or more periods of time.

In response to detecting a fraud and/or a leakage, the system may report the detection of the fraud and/or the leakage in the network to a management system for subsequent processing, such as reporting the detection to a relevant person to follow up on the situation, locating the fraud and/or the leakage in the network, etc.

The described system allows determining a topology of a network having a given node as a root node based on determining relationships or correlations between utility usages of a plurality of nodes and utility usage recorded at the given node. The described system further enables detecting fraud and leakage in the network by comparing the utility usages associated with the plurality of nodes and the utility consumption recorded at the given node based on the determined topology and/or a previously known topology of the network. Through the described system, a utility service provider can easily detect potential fraud and leakage in a network automatically.

In the examples described herein, the system computes correlations between utility usage recorded at a given node and utility usages of a plurality of nodes, determines a topology of a network including the given node and some of the plurality of nodes (with the given node as a root node), monitors and detects frauds and/or leakages in the network. However, in other implementations, one or more other devices or services may perform some or all of these functions. For example, in one implementation, a device or service may compute correlations between utility usage recorded at a given node and utility usages of a plurality of nodes, while another device or service may determine a topology of a network based on the computed correlations, and yet another device or service may monitor and detect frauds and/or leakages in the network based on the determined topology.

The application describes multiple and varied embodiments and implementations. The following section describes an example environment that is suitable for practicing various implementations. Next, the application describes example systems, devices, and processes for implementing network topology detection and fraud detection.

Example Architecture

FIG. 1 is a schematic diagram of an example architecture 100 usable to implement a network topology detection and fraud detection system 102. The architecture 100 includes a plurality of nodes 104-1, 104-2, 104-3, 104-4, 104-5, . . . , 104-N (collectively referred to as nodes 104). In this example, N represents a number of nodes arranged in a network. In one implementation, the network may include a distribution network of utility services including, but not limited to, electricity, gas, water, etc. The plurality of nodes 104 are coupled to each other via utility service paths, such as electrical wiring paths, gas pipes, or water pipes, for example. In one implementation, these utility service paths may not be known (or may be partially known) to the network topology detection and fraud detection system 102 and/or a utility service provider of the distribution network due to dynamics and evolution of the distribution network over time. The plurality of nodes 104 may include, for example, nodes of customers of the utility service, nodes of junctions facilitating routing of the utility service to the customers, nodes of substations serving the utility service for a particular area, etc.

In some implementations, the plurality of nodes 104 may include or be associated with a plurality of devices 106-1, 106-2, 106-3, 106-4, 106-5, . . . , 106-M (collectively referred to as devices 106) communicatively coupled to each other via direct communication paths or "links." In this example, M represents a number of devices arranged in a communication network. In one implementation, the number of devices, M, may be the same as the number of nodes, N. In some implementations, the number of devices, M, may be greater or less than the number of nodes.

In one implementation, the communication network may include an autonomous routing area (ARA), such as a wide area network (WAN), metropolitan area network (MAN), local area network (LAN), neighborhood area network (NAN), personal area network (PAN), or the like. While only one ARA is shown in FIG. 1, in practice, multiple ARAs may exist and may collectively define a larger network, such as an advanced metering infrastructure (AMI) network.

As discussed above, the term "link" refers to a direct communication path between two devices (without passing through or being propagated by another device). The link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels.

In one implementation, some or all of the devices 106 may be implemented as any of a variety of conventional computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, combinations of the foregoing, or any device couplable to a communication network and capable of sending and/or receiving data.

In some implementations, some or all of the devices 106 may additionally or alternatively be implemented as any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

In this example, the devices 106 may further be configured to communicate with a central office 108 via an edge device (e.g., cellular relay, cellular router, edge router, DODAG root, etc.) which serves as a connection point of the ARA to a backhaul network(s) 110, such as the Internet. In this illustrated example, the device 106-1 serves as a cellular relay to relay communications from the other devices 106-2-106-M of the ARA to and from the central office 108 via the network(s) 110.

In one implementation, some or all of the devices 106 may include a processing unit 112. The processing unit 112 may include one or more processor(s) 114 communicatively coupled to memory 116. The memory 116 may be configured to store one or more software and/or firmware modules, which are executable on the processor(s) 114 to implement various functions. While the modules are described herein as being software and/or firmware stored in memory and executable on a processor, in other implementations, any or all of the modules may be implemented in whole or in part by hardware (e.g., as an ASIC, a specialized processing unit, etc.) to execute the described functions.

The memory 116 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

In one implementation, some or all of the devices 106 may additionally include a radio 118. The radio 118 comprises a radio frequency (RF) transceiver configured to transmit and/or receive RF signals via one or more of a plurality of channels/frequencies.

Additionally or alternatively, in some implementations, some or all of the devices 106 may include a network interface 120, and/or an input/output interface 122. The processing unit 112 may further be configured to receive and act on data from the network interface 120, received from the input/output interface 122, and/or stored in the memory 116. In some implementations, the memory 116 may also include a metrology module 124 configured to collect consumption data of one or more resources (e.g., electricity, water, natural gas, etc.), which may then be transmitted to one or more other devices 106 for eventual propagation to the central office 108 or other destination.

The network(s) 110, meanwhile, represents a backhaul network, which may itself comprise a wireless or a wired network, or a combination thereof. The network(s) 110 may be a collection of individual networks interconnected with each other and functioning as a single large network (e.g., the Internet or an intranet). Further, the individual networks may be wireless or wired networks, or a combination thereof.

The central office 108 may be implemented by one or more computing devices, such as servers, personal computers, laptop computers, routers, switches, etc. The one or more computing devices may be equipped with one or more processor(s) communicatively coupled to memory. In some examples, the central office 108 includes a centralized meter data management system that performs processing, analysis, storage, and/or management of data received from one or more of the devices 106. For instance, the central office 108 may process, analyze, store, and/or manage data obtained from a smart utility meter, sensor, control device, router, regulator, server, relay, switch, valve, and/or other devices. The central office 108 may additionally or alternatively include a network management system (NMS) for maintaining a registry of devices of the AMI network, device configuration settings, version information, and the like. Although the example of FIG. 1 illustrates the central office 108 in a single location, in some examples the central office may be distributed amongst multiple locations and/or may be eliminated entirely (e.g., in the case of a highly decentralized distributed computing platform).

In FIG. 1, the network topology detection and fraud detection system 102 is described to be separate from the central office 108 and the plurality of nodes 104 (or devices 106), and to communicate with the central office 108 and the plurality of devices 106 through the network(s) 110. In some implementations, the network topology detection and fraud detection system 102 may be included in the central office 108 and/or the plurality of nodes 104 (or devices 106). For example, the network topology detection and fraud detection system 102 may be included in the central office 108. In some implementations, a node 104 (such as a junction node or a substation node, for example) of the distribution network or a device 106 of the communication network may include the network topology detection and fraud detection system 102. In alternative implementations, functions of the network topology detection and fraud detection system 102 may be distributed amongst a plurality of nodes 104 (or devices 106) and/or the central office 108. In some implementations, the network topology detection and fraud detection system 102 may be included in servers 126 other than the central office 108.

In one implementation, the network topology detection and fraud detection system 102 is usable to determine a topology associated with part or all of the distribution network, and to detect fraud and leakage in the distribution network based on the determined (or previously known) topology of the distribution network or part of the distribution network.

Example Network Topology Detection

Figure 2:
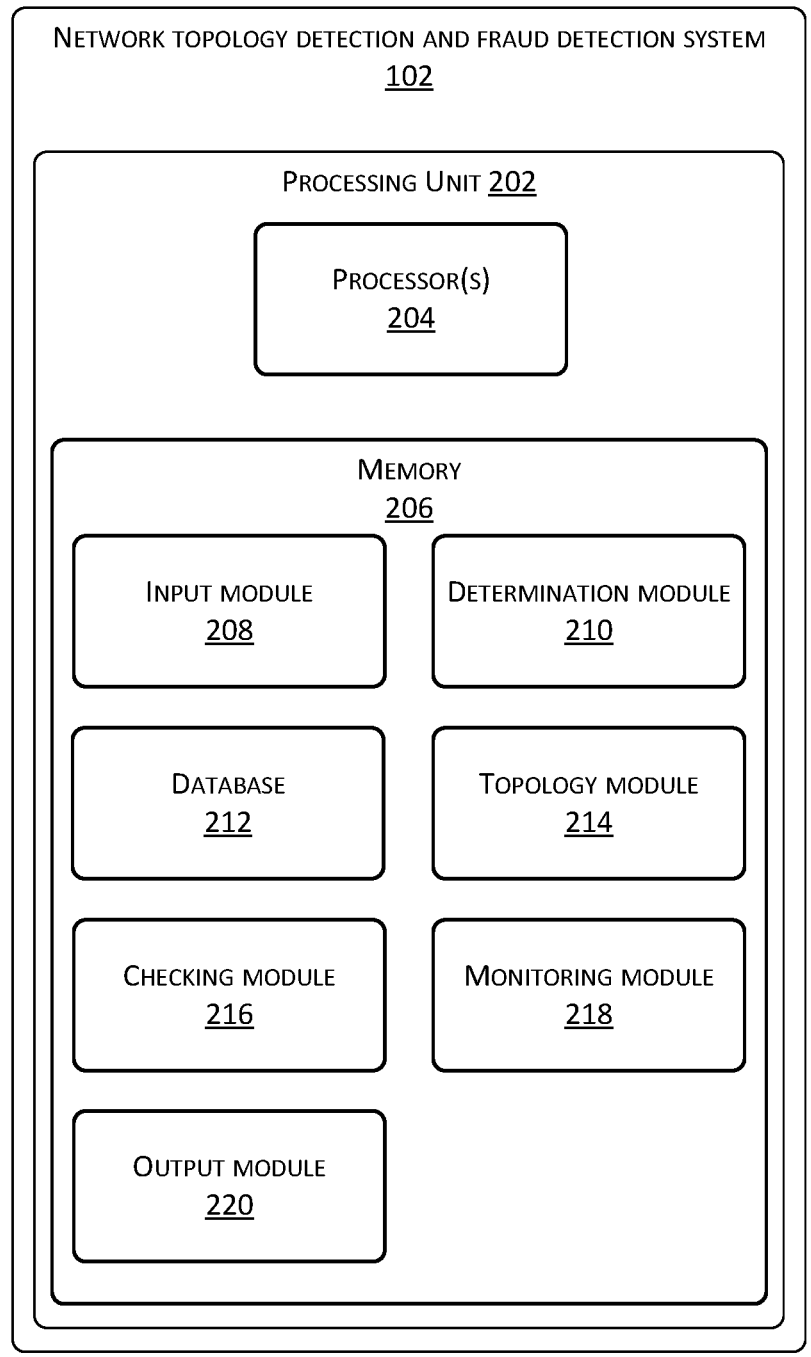
FIG. 2 illustrates the example network topology detection and fraud detection system of FIG. 1 in more detail.

FIG. 2 illustrates the example network topology detection and fraud detection system 102 in more detail. In one implementation, the network topology detection and fraud detection system 102 may include, but is not limited to, a processing unit 202. The processing unit 202 may include one or more processor(s) 204 communicatively coupled to memory 206. The memory 206 may be configured to store one or more software and/or firmware modules, which are executable on the processor(s) 204 to implement various functions. While the modules are described herein as being software and/or firmware stored in memory and executable on a processor, in other implementations, any or all of the modules may be implemented in whole or in part by hardware (e.g., as an ASIC, a specialized processing unit, etc.) to execute the described functions. The memory 206 may comprise computer-readable media as defined in the foregoing description.

In one implementation, the network topology detection and fraud detection system 102 may include an input module 208 that receives an instruction or request from the central office 108 or a management or query system associated with the utility service, for example, to determine a network topology associated with a node 104 (such as the node 104-4, for example). Additionally or alternatively, the input module 208 may receive an instruction or request from the node 104 (or the device 106 associated with the node 104) to determine a network topology associated with the node 104.

In one implementation, the node 104 may include, for example, a junction node (such as a transformer node for electricity service), a substation node of the distribution network, etc. In some implementations, the network topology associated with the node 104 may include, but is not limited to, a downstream topology of a part of the utility service distribution network having the node 104 as a root node and including one or more immediate child nodes of the node 104 to which the utility service is delivered via the node 104. In one implementation, an immediate child node of a given node may include a node that is immediately connected to the given node and is a child node of the given node in the distribution network.

By way of example and not limitation, the node 104-4 in FIG. 1 may be used as a node given in the received instruction or request to illustrate operations of the network topology detection and fraud detection system 102. In one implementation, the network topology detection and fraud detection system 102 may include a determination module 210 to determine one or more nodes 104 of the distribution network of the utility service that may be considered as potential components of the network topology associated with the given node 104-4 that is to be determined.

In one implementation, the network topology detection and fraud detection system 102 may obtain location information of the nodes 104 of the distribution network to narrow down the number of nodes 104 to be considered for determining the network topology associated with the node 104-4, for example. By way of example and not limitation, the network topology detection and fraud detection system 102 may determine that nodes 104 having associated devices 106 belonging to a same and/or neighboring communication network(s) (e.g., a same and/or neighboring ARA network(s)) of the given node 104-4 are potential components of the network topology of the part of the distribution network that is associated with the node 104-4 to be determined.

Additionally or alternatively, in some implementations, the network topology detection and fraud detection system 102 may obtain information about respective physical areas (such as city, district, street, building, etc.) of the plurality of nodes 104 from a database 212 of the network topology detection and fraud detection system 102 or a database outside the network topology detection and fraud detection system 102. The network topology detection and fraud detection system 102 may determine that nodes 104 which belong to physical area(s) that is/are the same as or neighboring to a physical area of the node 104-4 are potential components of the network topology to be determined. In some implementations, the physical area of the node 104-4 may include one or more junction nodes and a plurality of customer nodes of the distribution network.

Additionally or alternatively, in one implementation, the distribution network may be divided into a number of grids. The network topology detection and fraud detection system 102 may obtain information of respective grids of the plurality of nodes 104 from the database 212 or a database outside the network topology detection and fraud detection system 102. In one implementation, the network topology detection and fraud detection system 102 may determine that nodes 104 which belong to grid(s) that is/are the same as and/or neighboring to a grid of the node 104-4 are potential components of the network topology to be determined. In some implementations, the grid of the node 104-4 may include one or more junction nodes and a plurality of customer nodes of the distribution network.

In one implementation, the input module 208 of the network topology detection and fraud detection system 102 may further receive utility service related information from the given node 104-4 and the plurality of considered nodes 104 (e.g., the nodes 104-1, 104-2, and 104-5, etc.) of the distribution network. Additionally or alternatively, the input module 208 of the network topology detection and fraud detection system 102 may receive the utility service related information from device 106-4 associated with (or included in) the given node 104-4 and devices 106 (e.g., the devices 106-1, 106-2, and 106-5, etc.) of the communication network that are associated with the plurality of considered nodes 104.

In one implementation, the utility service related information of a node 104 may include, but is not limited to, information of utility usage of the node 104 (e.g., a customer node), utility usage (or delivery) information through the node 104 (e.g., a junction node, a substation node, etc.), etc. The utility usage of the node 104 may be measured in terms of a physical quantity. Depending on the type of utility service considered, the physical quantity may include, but is not limited to, an electrical current usage, an electrical voltage usage or an electrical power usage (for electricity service), a volume of gas usage (for gas service) or a volume of water usage (for water service), etc.

In some implementations, the utility usage information of a node 104 (or a device 106 associated therewith) may include, but is not limited to, changes in usage values of the utility service recorded at the device 106 associated with (or included in) the node 104 at a regular time interval or at respective times of change. Additionally or alternatively, the utility usage of a node 104 (or a device 106 associated therewith) may include only, for example, changes (which are greater than or equal to a predetermined threshold or percentage) in usage values of the utility service recorded at the device 106 associated with (or included in) the node 104 at a regular time interval or at respective times of change, etc. Additionally or alternatively, the utility usage information of a node 104 (or a device 106 associated therewith) may include usage values of the utility service recorded at the device 106 associated with (or included in) the node 104 at a regular time interval. In one implementation, the utility usage information of a node 104 (or a device 106 associated therewith) may further include respective time stamps of the usage values and/or the changes in usage values of the utility service recorded at the device 106 associated with (or included in) the node 104.

In one implementation, the network topology detection and fraud detection system 102 may include a topology module 214 to determine which one(s) of the plurality of considered nodes 104 is/are part(s) of the topology of the part of the distribution network associated with the given node 104-4 that is to be determined. In one implementation, the topology module 214 may compare utility usage information of the plurality of considered nodes 104 with utility usage (or delivery) information of the given node 104-4 to determine which one(s) of the plurality of considered nodes 104 is/are part(s) of the network topology associated with the given node 104-4 to be determined.

By way of example and not limitation, the topology module 214 may apply a correlation function to compute correlations between respective utility usages of the plurality of considered nodes 104 and the utility usage of the given node 104-4. For example, the topology module 214 may employ a correlation function, such as a cross correlation function, to compute correlations between respective patterns of utility usages of the plurality of considered nodes 104 and a pattern of the utility usage of the given node 104-4 over one or more predetermined periods of time. In one implementation, the topology module 214 may compute correlations between respective changes (or patterns of changes) in usage values of the utility service of the plurality of considered nodes 104 and changes (or pattern(s) of changes) in usage values of the utility service of the given node 104-4 over one or more predetermined periods of time. Additionally or alternatively, in some implementations, the topology module 214 may compute correlations between respective usage values (or patterns of usage values) of the utility service of the plurality of considered nodes 104 and usage values (or pattern(s) of usage values) of the utility service of the over node 104-4 over one or more predetermined periods of time.

In one implementation, in response to computing the correlations between the utility usages of the plurality of considered nodes 104 and the utility usage of the given node 104-4, the network topology detection and fraud detection system 102 may compare the computed correlations with a predetermined correlation threshold. In one implementation, the network topology detection and fraud detection system 102 may determine that a considered node 104 is a component or part of the topology of the network associated with the given node 104-4 if a computed correlation between the considered node 104 (e.g., 104-1) and the given node 104-4 is greater than or equal to the predetermined correlation threshold.

In response to determining one or more considered nodes (e.g., the customer nodes 104-1 and 104-2) to be components or parts of the topology of the network associated with the given node 104-4, the network topology detection and fraud detection system 102 may successfully determine the topology of the network associated with the given node 104-4 to include the customer nodes 104-1 and 104-2, for example.

Alternatively, in some implementations, upon finding or determining one or more considered nodes 104 (e.g., the customer nodes 104-1 and 104-2) to be components or parts of the network topology associated with the given node 104-4, the network topology detection and fraud detection system 102 may further include a checking module 216 to check whether the network topology found or determined for the given node 104-4 is complete. For example, the checking module 216 may determine whether one or more customer nodes 104 that belong to the network topology associated with the given node 104-4 have not been considered by the network topology detection and fraud detection system 102. In one implementation, the checking module 216 may determine whether one or more customer nodes 104 have not previously been considered by comparing the utility usage information of the one or more found nodes 104 with the utility usage information of the given node 104-4.

By way of example and not limitation, the checking module 216 may compare a sum (or combination) of the utility usages (usage values or usage value changes) of the one or more nodes 104 (e.g., the customer nodes 104-1 and 104-2) found or determined by the topology module 214 with the utility usage of the given node 104-4 at one or more instants of time (or over one or more periods of time), and determine if they are the same. If they are the same, the checking module 216 may determine that the determined network topology is complete. If they are different, e.g., the sum of the utility usages of the one or more found nodes is less than the utility usage of the given node 104-4, the checking module 216 may determine that some nodes that belong to the network topology are missing.

In one implementation, in response to determining that some nodes that belong to the network topology are missing, the network topology detection and fraud detection system 102 may expand a scope of consideration. By way of example and not limitation, the checking module 216 may obtain information about one or more adjacent communication networks that have not been considered previously from, for example, the database 212 or other database outside the network topology detection and fraud detection system 102. The checking module 216 may consider nodes of these one or more adjacent communication networks for determining or finding missing nodes in this network topology detection associated with the given node 104-4. Additionally or alternatively, the checking module 216 may obtain information about one or more adjacent physical areas and/or grids that have not been considered previously from, for example, the database 212 or other database outside the network topology detection and fraud detection system 102.

In one implementation, the network topology detection and fraud detection system 102 may then repeat the foregoing operations of determining the network topology associated with the given node 104-4 until a complete topology is found. Additionally or alternatively, the network topology detection and fraud detection system 102 may then repeat the foregoing operations of determining the network topology associated with the given node 104-4 until a predetermined number of iterations for searching missing nodes is reached. Additionally or alternatively, the network topology detection and fraud detection system 102 may then repeat the foregoing operations of determining the network topology associated with the given node 104-4 until a current scope of consideration is greater than or equal to a reasonable scope associated with the given node. Additionally or alternatively, the network topology detection and fraud detection system 102 may then repeat the foregoing operations of determining the network topology associated with the given node 104-4 until an administrator temporarily terminates the operations to adjust values of parameters such as the predetermined correlation threshold, for example.

In one implementation, if the sum of the utility usages (e.g., values or value changes) of the one or more found nodes is different from the utility usage of the given node 104-4 and no missing node is found after a predetermined number of iterations, for example, the checking module 216 may determine that a fraud or leakage may exist in the network. In one implementation, the checking module 216 may notify a relevant person such as a system administrator or personnel of the central office 108, for example, to follow up on this observation of possible fraud and/or leakage in the network.

Example Fraud Detection

Given a successfully determined or previously known network topology associated with a node 104 (e.g., the junction node 104-4), the network topology detection and fraud detection system 102 may further be configured to detect fraud and leakage in (the part of) the distribution network associated with the node 104-4. In one implementation, the network topology detection and fraud detection system 102 may include a monitoring module 218 to monitor the distribution network and determine whether a fraud and/or a leakage occur(s) in the distribution network. In one implementation, the monitoring module 218 may determine whether a discrepancy exists in utility usage information among one or more nodes in the distribution network. The discrepancy may include, for example, a discrepancy due to a fraud and/or a leakage in the distribution network.

Continuing with the above example of using the junction node 104-4, in one implementation, the monitoring module 218 may determine whether a change in utility usage value of the junction node 104-4, for example, is unattributable by any combination of one or more changes in utility usage values of the nodes 104 included in the topology. Additionally or alternatively, the monitoring module 218 may determine whether a change in usage value of a node (e.g., the node 104-1) included in the topology is unattributable by any change in the usage value of the junction node 104-4. Additionally or alternatively, the monitoring module 218 may determine whether a difference exists between a value (such as utility usage value) associated the junction node 104-4 (or a metering device associated therewith) and a sum of values (e.g., a sum of utility usage values) associated with the nodes (or metering devices associated therewith) included in the topology at a particular time or over a predetermined period of time. If no change in the utility usage of the junction node 104-4 or any node included in the topology is unattributable or no difference exists, the monitoring module 218 may determine that no fraud or leakage occur in the network.

Alternatively, in response to detecting or determining that a usage value change in a node (e.g., the node 104-1) of the nodes included in the topology is unattributable by any usage value change of the junction node 104-4, the monitoring module 218 may determine that a fraud associated with that particular node 104-1 (e.g., tampering a metering device 106-1 associated with the node 104-1) is committed. Additionally or alternatively, the monitoring module 218 may determine that a fraud (e.g., bypassing the metering device 106-1 associated with the node 104-1) and/or a leakage between the node 104-1 and the junction node 104-4 occurs.

In some implementations, in response to determining that one or more changes in the usage value of the junction node 104-4 are unattributable by any combination of one or more changes in utility usage values of the nodes 104 included in the topology, the monitoring module 218 may determine that a fraud (e.g., bypassing a metering device 106-1 associated with a node 104-1 included in the topology) may exist in the part of the distribution network associated with the junction node 104-4. Additionally or alternatively, the monitoring module 218 may determine that a leakage between the node 104-1 and the junction node 104-4 occurs.

Additionally or alternatively, in one implementation, in response to determining that each change in the usage value of the nodes 104 included in the topology is attributable by changes in the usage value of the junction node 104-4 and one or more changes in the usage value of the junction node 104-4 are unattributable by any combination of one or more changes in utility usage values of the nodes 104 included in the topology, the monitoring module 218 may determine that a fraud (e.g., bypassing a metering device 106-1 associated with a node 104-1 included in the topology) may exist in the part of the distribution network associated with the junction node 104-4. Additionally or alternatively, the monitoring module 218 may determine that a leakage between the node 104-1 and the junction node 104-4 occurs.

Additionally or alternatively, in some implementations, in response to determining that detecting that each change in the usage value associated with the junction node 104-4 is attributable by a combination of one or more changes in the usage values associated with one or more of the nodes 104 included in the topology and a difference exists between a usage value associated with the junction device 104-4 and a sum of usage values associated with the nodes 104 included in the topology at a particular time or over a predetermined period of time, the monitoring module 218 may determine that a leakage between a node (e.g., the node 104-1) and the junction node 104-4 occurs.

In response to detecting a fraud and/or a leakage in the distribution network, the network topology detection and fraud detection system 102 may include an output module 220 to notify a relevant person such as a system administrator or personnel of the central office 108, for example, to follow up on this detection of the fraud and/or the leakage, and fix the fraud and/or the leakage in the distribution network.

Alternative Implementations

Although the foregoing implementations describe determining a topology of a part or subset of a distribution network having a given node as a root node of the part or subset of the distribution network, the present disclosure is not limited thereto. In one implementation, a topology of a network including a given node (e.g., the customer node 104-2, etc.) to be determined may alternatively include an upstream topology associated with the given node 104-2 that includes a network of the given node 104-2 and a junction node (e.g., the junction node 104-4) through which the utility service is delivered to the given node 104-2.

In some implementations, a topology of a network including a given node (e.g., the customer node 104-2, etc.) to be determined may alternatively include a coverage topology that includes a part of the distribution network of the utility service including the given node 104-2, a junction node (e.g., the junction node 104-4) through which the utility service is delivered to the given node 104-2 and other nodes of the distribution network to which the utility service is delivered via the junction node 104-4, for example.

In one implementation, the network topology detection and fraud detection system 102 may determine which type of topology an instruction or a request is interested in based on, for example, a type of node of the distribution network for which the topology is to be determined. By way of example and not limitation, the network topology detection and fraud detection system 102 may determine that a downstream topology is to be determined for a node, such as a junction node or substation node, that includes child nodes in the distribution network of the utility service. In some implementations, the network topology detection and fraud detection system 102 may determine that an upstream or coverage topology is to be determined for a node, such as a customer node, that includes no child node in the distribution network of the utility service.

Additionally or alternatively, the network topology detection and fraud detection system 102 may determine which type of topology an instruction or a request is interested in based on, for example, information in the instruction or the request received. For example, the instruction or the request may be received from the central office 108 (or other management or query system), and include information about which type of the topologies the central office 108 (or other management or query system) is interested in. Additionally or alternatively, in some implementations, the network topology detection and fraud detection system 102 may determine a topology of part or all of the distribution network based on an instruction or request from the central office 108 (or other management or query system).

In some implementations, in order to accommodate latencies between nodes with respect to utility usage information (e.g., a change in water usage at node 104-1 may not be instantaneously reflected at node 104-4, etc.), the network topology detection and fraud detection system 102 may employ a sliding window in computing correlations of usage values or changes in usage values between two nodes (e.g., a given node and a considered node, etc.) over one or more periods of time. By using a sliding window, the network topology detection and fraud detection system 102 may tolerate mismatching of utility usage values or value changes between two nodes due to latency (e.g., because of a distance between the two nodes, etc.), and therefore reduce the likelihood of obtaining false negatives in network topology detection.

Exemplary Methods

Figure 3:
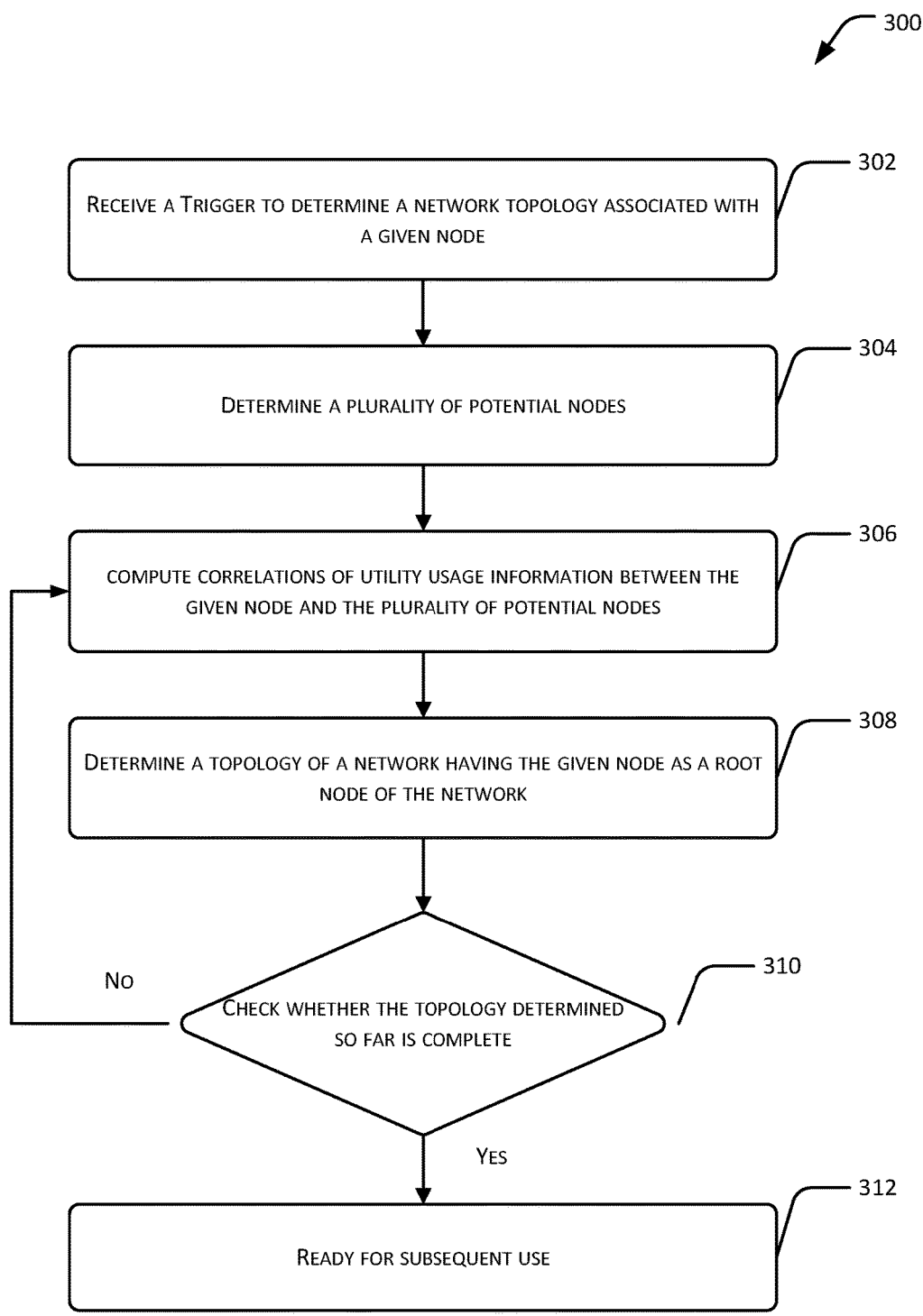
FIG. 3 illustrates an example method of network topology detection.
Figure 4:
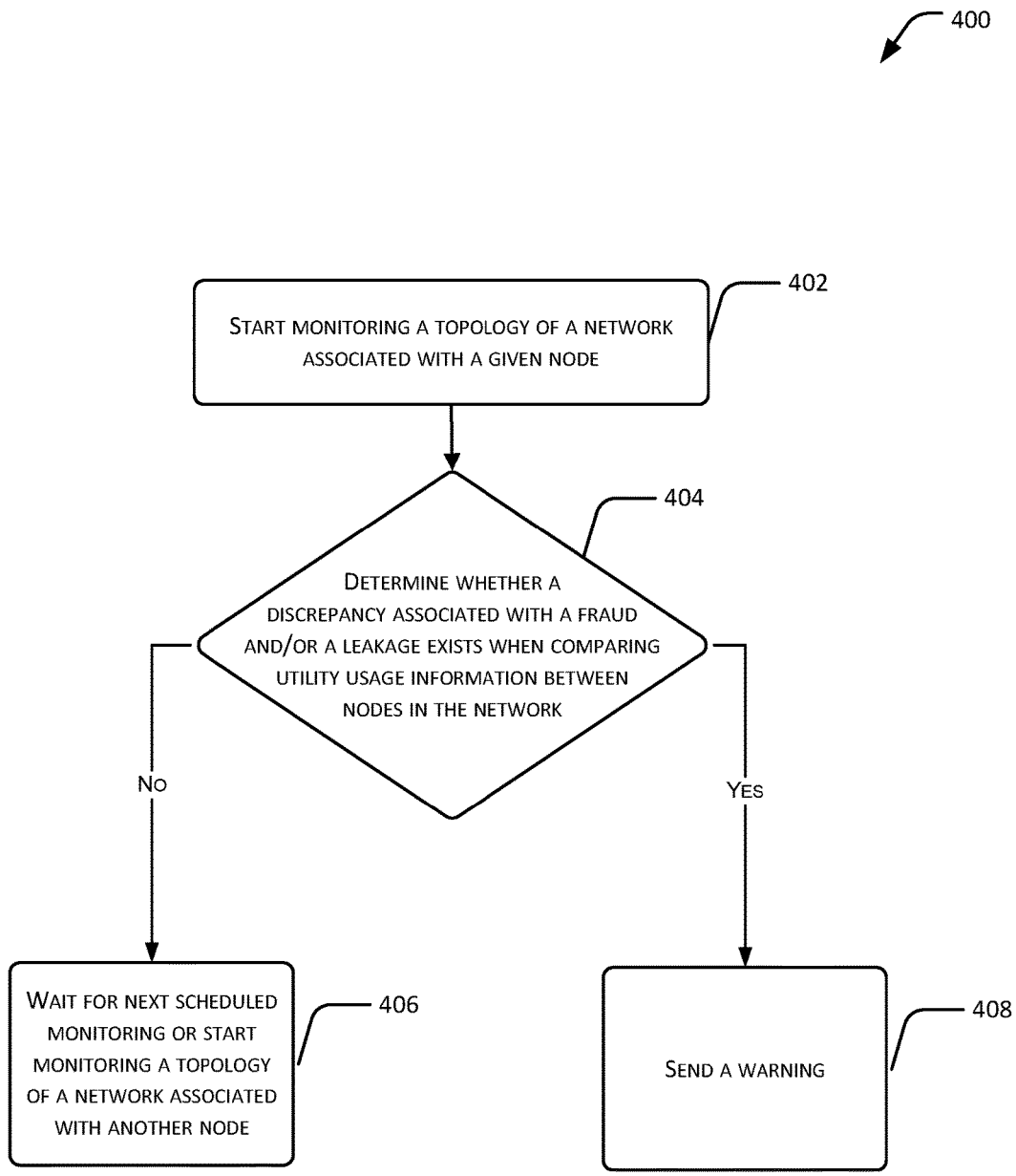
FIG. 4 illustrates an example method of fraud detection.

FIG. 3 is a flow chart depicting an example method 300 of network topology detection. FIG. 4 is a flow chart depicting an example method 400 of fraud detection. The methods of FIG. 3 and FIG. 4 may, but need not, be implemented in the environment of FIG. 1 and using the system of FIG. 2. For ease of explanation, methods 300 and 400 are described with reference to FIGS. 1-2. However, the methods 300 and 400 may alternatively be implemented in other environments and/or using other systems.

Methods 300 and 400 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 3, at block 302, the network topology detection and fraud detection system 102 may be triggered to determine a topology of a part of a utility service distribution network including a given node as a root node. In one implementation, the network topology detection and fraud detection system 102 may receive an instruction or a request to determine a topology of a part of a utility service distribution network including a given node as a root node. Additionally or alternatively, the network topology detection and fraud detection system 102 may determine a topology of a part of a utility service distribution network including a given node as a root node on a regular basis. Additionally or alternatively, the network topology detection and fraud detection system 102 may be triggered by an event to determine a topology of a part of a utility service distribution network. For example, the network topology detection and fraud detection system 102 may detect abnormal activities or readings (such as significant changes in utility service consumption, for example) in a given node and may be triggered to determine a topology of a part of a utility service distribution network including the given node as a root node of the topology to be determined.

At block 304, in response to receiving a given node, the network topology detection and fraud detection system 102 may determine a plurality of nodes of the utility service distribution network that are potentially parts of the topology associated with the given node to be determined. The network topology detection and fraud detection system 102 may determine the plurality of potential nodes based on information such as associated physical locations, associated communication networks, and/or associated grids of the distribution network, for example.

At block 306, upon determining a plurality of potential nodes to be considered, the network topology detection and fraud detection system 102 may determine which one or more potential nodes belong to the topology to be determined based on correlations between utility usages (or changes in the utility usages) of respective potential nodes and utility usage (or changes in the utility usage) of the given node.

At block 308, the network topology detection and fraud detection system 102 may compare the correlations between the plurality of potential nodes and the given node to a predetermined correlation threshold. In one implementation, if a correlation between a potential node and the given node is greater than or equal to a predetermined correlation threshold, the network topology detection and fraud detection system 102 may render the potential node to be a part of the topology to be determined.

At block 310, upon determining one or more potential nodes to be parts of the topology to be determined, the network topology detection and fraud detection system 102 may determine whether the topology determined so far is complete. The network topology detection and fraud detection system 102 may determine whether the topology is determined so far complete based on, for example, whether a difference exists between the utility usage (or changes in the utility usage) of the given node and a sum of the utility usages (or changes in the utility usages) of the one or more determined nodes. If a difference exists, the network topology detection and fraud detection system 102 may determine that the topology determined so far is incomplete. The network topology detection and fraud detection system 102 may then repeat the operations of topology determination with a larger scope of consideration, for example, by considering additional nodes in other communication networks, physical locations and/or grids of the distribution network that have not been considered previously.

At block 312, if no difference exists, the network topology detection and fraud detection system 102 may determine that the topology determined so far is complete. The network topology detection and fraud detection system 102 may make available of the determined topology associated with the given node for subsequent use such as fraud detection.

Referring back to FIG. 4, at block 402, given a previously determined or known topology of a network associated with a given node (with the given node being a root node of the network), the network topology detection and fraud detection system 102 may monitor and/or detect frauds and/or leakages in the network on a regular basis and/or upon request, for example, by the central office 108 or a maintenance personnel.

At block 404, the network topology detection and fraud detection system 102 may determine whether a fraud and/or a leakage may exist in the network by determining whether a discrepancy exists between utility usage information, such as changes in utility usage values, for example, of the given nodes and a plurality of nodes branching from the given node in the network.

At block 406, if no discrepancy exists, the network topology detection and fraud detection system 102 may determine that no fraud and leakage exist in the network. The network topology detection and fraud detection system 102 may wait for a next scheduled monitoring time for this given node. Additionally or alternatively, the network topology detection and fraud detection system 102 may shift to another node of the distribution network and determine whether a fraud and/or a leakage exists in a topology of a network associated with another node.

At block 408, if a discrepancy exists, the network topology detection and fraud detection system 102 may determine that a fraud and/or a leakage exist(s) in the network. In response to determining or detecting a fraud and/or a leakage exist(s) in the network, the network topology detection and fraud detection system 102 may send a warning or alert to the central office 108 or the maintenance personnel for follow-up or field investigation to fix the fraud and/or the leakage in the network.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
receiving, at an electricity meter of a utility network, a trigger to determine a physical power distribution topology of at least a portion of the utility network associated with a given node;
identifying, at the electricity meter, one or more other utility metering nodes potentially connected to the given utility metering node based, at least in part, on location information or communication network information of the given utility metering node and the one or more other utility metering nodes;
correlating, by the electricity meter, value changes indicating a change in amount of utility consumption associated with the given utility metering node and value changes indicating a change in amount of utility consumption associated with the one or more other utility metering nodes with respect to a physical quantity; and
determining, at the electricity meter, the physical power distribution topology of at least the portion of the utility network comprising the given utility metering node and at least one node of the one or more other utility metering nodes based at least in part on the correlating of value changes that indicate the change in amount of utility consumption associated with the given utility metering node and the value changes indicating the change in amount of utility consumption associated with the one or more other utility metering nodes.

2. The method as recited in claim 1, wherein the electricity meter is part of the physical power distribution topology of at least the portion of the utility network.

3. The method as recited in claim 1, wherein the given utility metering node comprises a root node, a junction node, or a substation node.

4. The method as recited in claim 1, wherein prior to the determining of the physical power distribution topology of at least the portion of the utility network, the portion of the physical topology was undetermined.

5. The method as recited in claim 1, wherein the given utility metering node comprises an electricity meter, and the physical quantity comprises a usage of an electrical current, an electrical voltage or an electrical power.

6. The method as recited in claim 1, further comprising receiving records of respective value changes from the one or more other utility metering nodes.

7. The method as recited in claim 1, further comprising determining whether a discrepancy exists in value information among one or more other utility metering nodes in the utility network based on the determined topology, the discrepancy comprising a discrepancy due to a fraud and/or a leakage in the physical power distribution network.

8. The method as recited in claim 7, wherein the determining whether a discrepancy exists comprises at least one of:

determining whether a value change associated with the given utility metering node is attributable to a combination of one or more value changes associated with at least one of the one or more other utility metering nodes, or determining whether a difference exists between a value associated with the given utility metering node and a sum of values associated with the one or more other utility metering nodes with respect to the physical quantity at a particular time.

9. The method as recited in claim 7, wherein the determining whether a discrepancy exists comprises detecting that a discrepancy exists in the value information among the one or more other utility metering nodes in the utility network based on the determined topology.

10. An electricity meter comprising:
a processing unit configured to perform acts comprising:
receiving, at the electricity meter, a trigger to determine a physical power distribution topology of at least a portion of the utility network associated with a given utility metering node;
identifying, at the electricity meter, one or more other utility metering nodes potentially connected to the given utility metering node based, at least in part, on location information or communication network information of the given utility metering node and the one or more other utility metering nodes;
correlating, by the electricity meter, value changes indicating a change in amount of utility consumption associated with the given utility metering node and value changes indicating a change in amount of utility consumption associated with the one or more other utility metering nodes with respect to a physical quantity; and
determining, at the electricity meter, the physical power distribution topology of at least the portion of the utility network comprising the given utility metering node and at least one node of the one or more other utility metering nodes based at least in part on the correlating of value changes that indicate the change in amount of utility consumption associated with the given utility metering node and the value changes indicating the change in amount of utility consumption associated with the one or more other utility metering nodes.

11. The electricity meter of claim 10, further comprising a metrology module configured measure utility consumption with respect to the physical quantity at a site of the electricity meter.

12. The electricity meter of claim 10, wherein the electricity meter is part of the physical power distribution topology of at least the portion of the utility network.

13. The electricity meter of claim 10, wherein the given utility metering node comprises a root node, a junction node, or a substation node.

14. The electricity meter of claim 10, wherein prior to the determining of the physical power distribution topology of at least the portion of the utility network, the portion of the physical topology was undetermined.

15. The electricity meter of claim 10, wherein the given utility metering node comprises an electricity meter, and the physical quantity comprises a usage of an electrical current, an electrical voltage or an electrical power.

16. The electricity meter of claim 10, further comprising a network interface communicatively coupled to the processing unit, the network interface configured to receiving data of respective value changes from the one or more other utility metering nodes.

17. The electricity meter of claim 10, the acts further comprising determining whether a discrepancy exists in value information among one or more other utility metering nodes in the utility network based on the determined topology, the discrepancy comprising a discrepancy due to a fraud and/or a leakage in the physical power distribution network.

18. The electricity meter of claim 17, wherein the determining whether a discrepancy exists comprises at least one of:
determining whether a value change associated with the given utility metering node is attributable to a combination of one or more value changes associated with at least one of the one or more other utility metering nodes, or
determining whether a difference exists between a value associated with the given utility metering node and a sum of values associated with the one or more other utility metering nodes with respect to the physical quantity at a particular time.

19. The electricity meter of claim 17, wherein the determining whether a discrepancy exists comprises detecting that a discrepancy exists in the value information among the one or more other utility metering nodes in the utility network based.

20. One or more non-transitory computer readable media storing executable instructions that, when executed by a processing unit of an electricity meter, configure the electricity meter to perform acts comprising:
receiving, at the electricity meter, a trigger to determine a physical power distribution topology of at least a portion of a utility network associated with a given utility metering node;
identifying, at the electricity meter, one or more other utility metering nodes potentially connected to the given utility metering node based, at least in part, on location information or communication network information of the given utility metering node and the one or more other utility metering nodes;
correlating, by the electricity meter, value changes indicating a change in amount of utility consumption associated with the given utility metering node and value changes indicating a change in amount of utility consumption associated with the one or more other utility metering nodes with respect to a physical quantity; and
determining, at the electricity meter, the physical power distribution topology of at least the portion of the utility network comprising the given utility metering node and at least one node of the one or more other utility metering nodes based at least in part on the correlating of value changes that indicate the change in amount of utility consumption associated with the given utility metering node and the value changes indicating the change in amount of utility consumption associated with the one or more other utility metering nodes.

* * * * *